US012570372B2

(12) United States Patent
Silva

(10) Patent No.: US 12,570,372 B2
(45) Date of Patent: Mar. 10, 2026

(54) ELECTRIC AUXILIARY WHEEL

(71) Applicant: Clever Silva, Green Cove Springs, FL (US)

(72) Inventor: Clever Silva, Green Cove Springs, FL (US)

( * ) Notice: Subject to any disclaimer, the term of this patent is extended or adjusted under 35 U.S.C. 154(b) by 0 days.

(21) Appl. No.: 18/966,258

(22) Filed: Dec. 3, 2024

(65) Prior Publication Data

US 2025/0187702 A1 Jun. 12, 2025

(30) Foreign Application Priority Data

Dec. 7, 2023 (TW) ................................. 112147664

(51) Int. Cl.
| | |
|---|---|
| *B62M 6/60* | (2010.01) |
| *B62J 15/00* | (2006.01) |
| *B62K 5/027* | (2013.01) |
| *B62K 25/00* | (2006.01) |

(52) U.S. Cl.
CPC ................ *B62M 6/60* (2013.01); *B62J 15/00* (2013.01); *B62K 5/027* (2013.01); *B62K 25/00* (2013.01)

(58) Field of Classification Search
CPC .......... B62K 25/04; B62K 5/27; B62K 25/00; B62K 25/12; B62M 6/60; B62J 15/00; B62H 1/12
See application file for complete search history.

(56) References Cited

U.S. PATENT DOCUMENTS

2025/0187702 A1* 6/2025 Silva ........................ B62J 15/00

FOREIGN PATENT DOCUMENTS

| | | | | |
|---|---|---|---|---|
| CN | 112455572 A | * | 3/2021 | ............... B62H 1/12 |
| CN | 117382782 A | * | 1/2024 | ............... B62J 45/00 |
| CN | 221738002 U | * | 9/2024 | |
| DE | 102015202927 A1 | * | 8/2016 | ........... B62K 25/286 |
| KR | 0133079 Y1 | * | 12/1998 | ............... B62H 1/12 |

* cited by examiner

*Primary Examiner* — Karen Beck
(74) *Attorney, Agent, or Firm* — MUNCY, GEISSLER, OLDS & LOWE, P.C.

(57) ABSTRACT

An electric auxiliary wheel is mounted on the rear wheel of a bicycle. The electric auxiliary wheel comprises an assembly structure and an electric auxiliary wheel frame. The electric auxiliary wheel frame is connected to the bicycle rear wheel through the assembly structure. The assembly structure comprises a positioning plate that can be detachably mounted on the axle of the bicycle rear wheel, allowing users to mount the electric auxiliary wheel on any bicycle. In addition, the assembly structure features two telescopic components that are mounted on the positioning plate and connected to a T-shaped suspension mounting seat. The T-shaped suspension mounting seat is connected to the electric auxiliary wheel frame by two suspension relief plates, thereby assembling the frame with the assembly structure. The present disclosure evenly distributes the vibrations generated by an auxiliary wheel and an electric hub, thereby enhancing the stability of the structure.

9 Claims, 3 Drawing Sheets

40

31

32

12

31

11

36

13

16

15

51

50

ELECTRIC AUXILIARY WHEEL

FIELD OF INVENTION

The present disclosure relates to an electric auxiliary wheel, particularly to an electric auxiliary wheel that can be mounted on the rear wheel of any bicycle.

BACKGROUND OF THE INVENTION

The motor devices used in the rear wheels of electric bicycles available in the market are classified into front drive motors, center drive motors, and rear drive motors. The front drive motor has the advantage of being easy to assemble and disassemble. However, its installation on the front wheel and assembly via the movable head parts instead of the main frame structure results in a reduction of the driving force at the front wheel drive hub due to its installation on the head parts. In addition, the weight concentration on the handlebars, which are controlled by hand, can pose a risk during turning for older users who may have reduced grip strength.

The advantage of the center drive motor is its placement in the center of the frame, which is more logical in terms of distributing mechanical forces. However, its disadvantage is the high precision required for frame tolerances due to its central location. Because the motor is centered, it must drive the rear wheel through a chain, which requires a relatively higher output force. If the alignment of the chain is not straight, this can lead to frequent wear and the need for regular chain replacement. This wear will also affect the transmission gears mounted on the motor structure and the rear sprocket, which will also require frequent replacement, and if the pedal force is excessive, it may also cause the chain to break. Compared to the front drive motor, this structure has relatively less power loss.

The advantage of the rear drive motor is that its placement at the rear of the main frame structure ensures optimal driving force with no loss of power. The disadvantage is that all of the structural weight is concentrated on the rear wheel, and since the rider is also seated in the rear, all of the weight of the bicycle is concentrated on the rear wheel. This results in high wear on the rear tire and can lead to safety issues like fishtailing when riding on wet, slippery roads.

As mentioned above, whether the drive motor of the electric bicycle is placed in the front, middle, or rear, each position has its advantages and disadvantages. Once the drive motor is installed, it cannot be easily removed by individuals without special tools. In case the drive motor malfunctions, the entire rear wheel of the electric bicycle must be discarded or replaced, which complicates its use and increases its weight, making it difficult to use as a standard bicycle.

SUMMARY OF THE INVENTION

Based on the above deficiencies, the purpose of the present disclosure is to provide an electric auxiliary wheel, particularly one that can be mounted on the rear wheel of any bicycle.

To achieve this purpose, the present disclosure provides an electric auxiliary wheel comprising an assembly structure connecting an electric auxiliary wheel frame and a bicycle rear wheel. This assembly structure includes a positioning plate detachably mounted on a hub axle of the bicycle rear wheel, with two wings located on the upper and lower sides of the positioning plate; two telescopic tubes, one end of each telescopic tube being mounted on the wing and the other end extending in an X-direction to be connected to a straight tube of a T-shaped suspension mounting seat; and two suspension relief plates disposed on the left and right sides of the straight tube 1c in the X-direction, the electric auxiliary wheel frame being connected to these relief plates to be assembled with the assembly structure.

Preferably, the electric auxiliary wheel frame comprises two brackets connected by a fastening plate. The electric auxiliary wheel frame is equipped with two bearing sleeves, each of which protrudes in the X-direction from one bracket to the other.

Preferably, the T-shaped suspension mounting seat also comprises a cross tube perpendicular to one end of the straight tube, the cross tube is parallel to the two bearing sleeves.

Preferably, the two ends of the cross tube are connected to two positioning parts of the electric auxiliary wheel frame.

Preferably, the two suspension relief plates are two triangular suspension relief plates each having their base edges aligned parallel to a Z-direction. The two bearing sleeves are each connected to one of the base edges of the two suspension relief plates.

Preferably, the electric auxiliary wheel also comprises a shock-absorbing spring, one end of which is inserted between the two suspension relief plates and connected to the other base edge of the plates, the other end of the shock-absorbing spring being attached to the T-shaped suspension mounting seat by a fixing component.

Preferably, each of the telescopic tubes provides with a bearing at both ends.

Preferably, the electric auxiliary wheel frame is also equipped with a mudguard.

Preferably, the electric auxiliary wheel frame is also equipped with a wheel positioning part, in which wheel positioning part the axle of an electric hub of an auxiliary wheel is seated.

DETAILED DESCRIPTION OF THE PREFERRED EMBODIMENTS

To clearly illustrate the specific embodiments, structure, and effects achieved by the present disclosure, embodiments are provided and described with reference to the drawings as follows. The description is based on the X, Y, and Z Cartesian coordinate system. The X-direction corresponds to the horizontal left-right direction, the Y-direction corresponds to the vertical up-down direction, and the Z-direction corresponds to the horizontal front-rear direction. The Y-direction and Z-direction are orthogonal to the X-direction. The X-direction is referred to as left or right, the Y-direction is referred to as up or down, and the Z-direction is referred to as front or back.

Figure 1:
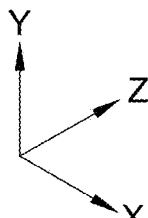
FIG. 1 is a schematic of an embodiment of the present disclosure.
Figure 2:
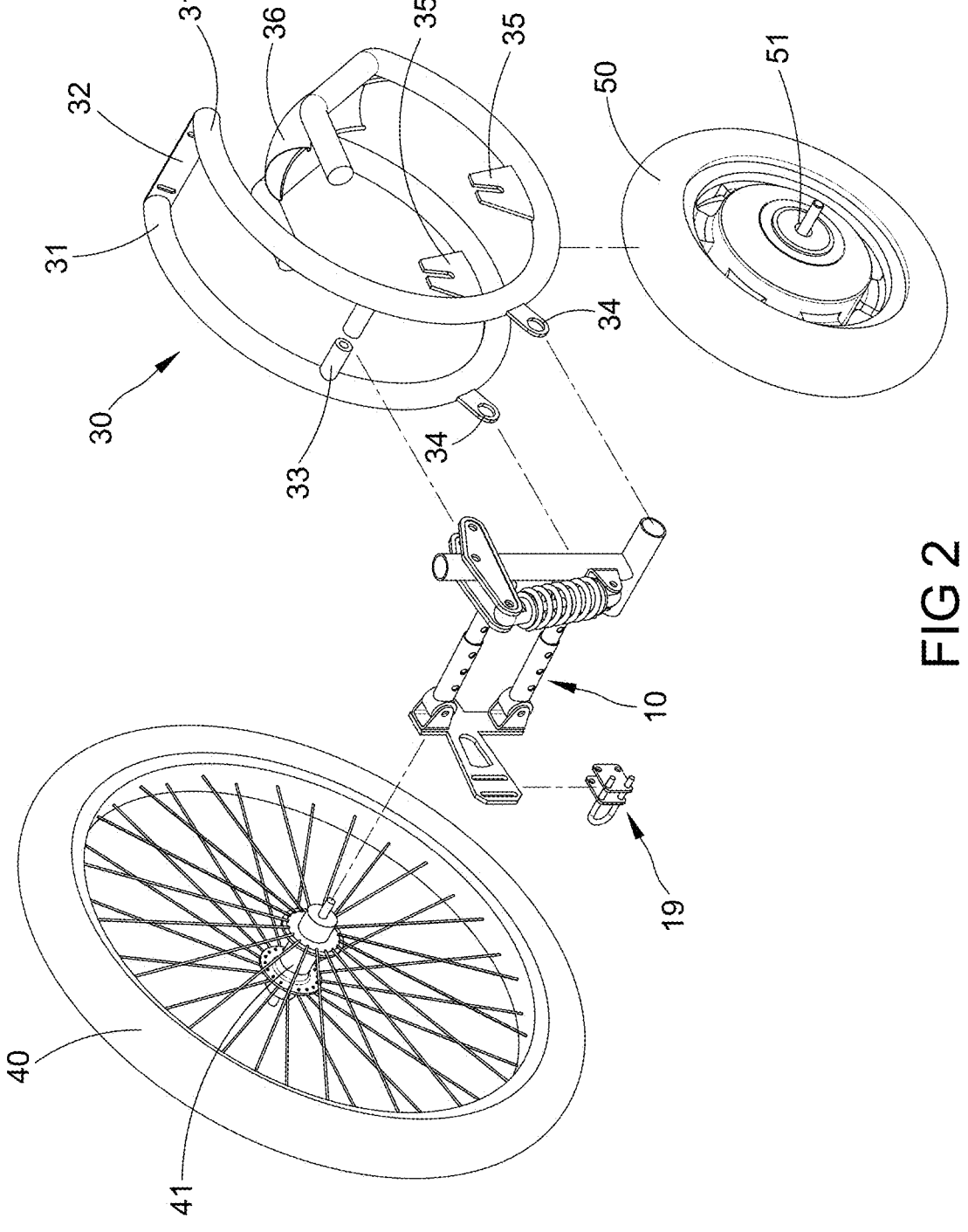
FIG. 2 is an exploded view of components of the embodiment of the present disclosure.
Figure 3:
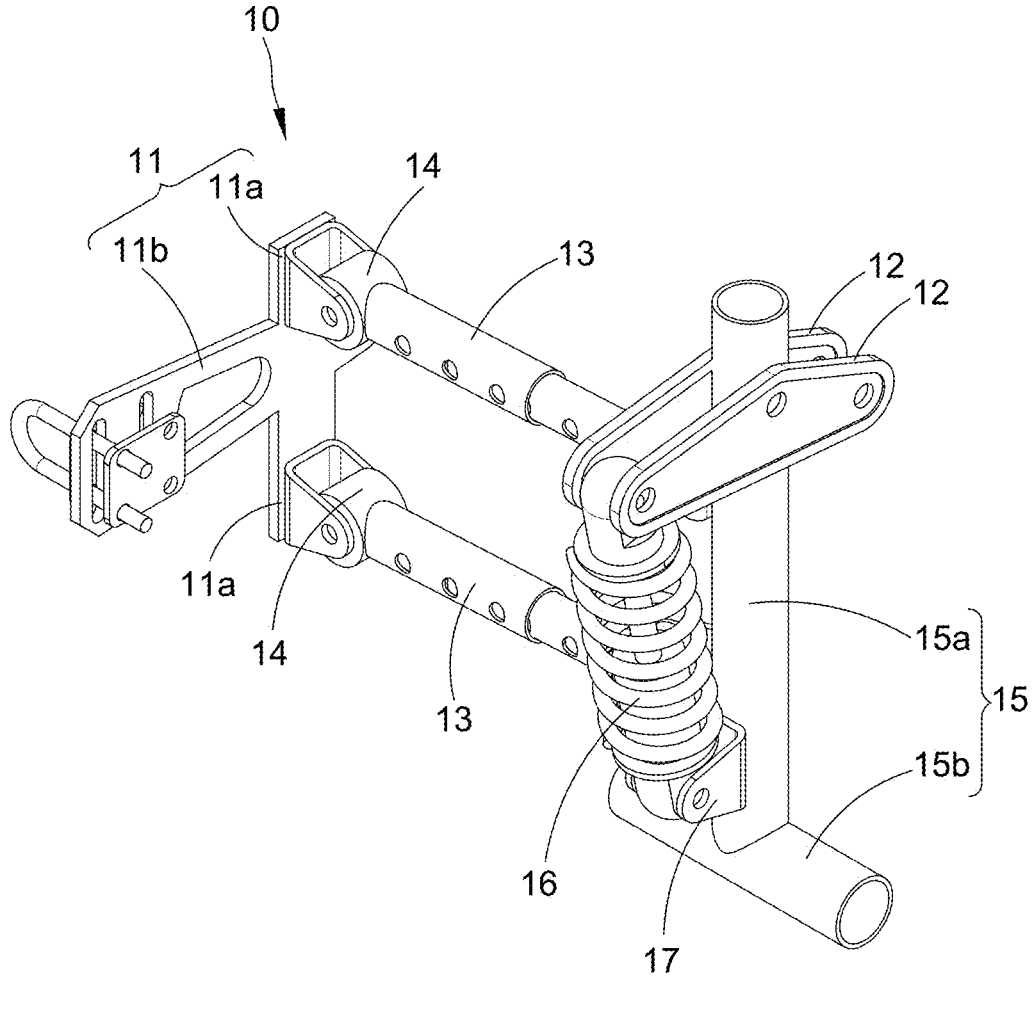
FIG. 3 is a schematic of the assembly structure of the embodiment of the present disclosure.

Referring to FIGS. 1 to 3, which illustrate an electric auxiliary wheel that is mounted on a bicycle rear wheel 40. This electric auxiliary wheel comprises an assembly structure 10 and an electric auxiliary wheel frame 30, with the electric auxiliary wheel frame 30 connected to the bicycle rear wheel 40 through the assembly structure 10.

The assembly structure 10 comprises a positioning plate 11 that can be detachably mounted on the hub axle 41 of the bicycle rear wheel 40, on the side without a bicycle chain. The rear end of a main body 11*b* of the positioning plate 11 is locked onto the hub axle 41 to form a first fixed point. Two wings 11*a* extend from the main body 11*b* in the Y-direction toward both sides. In this embodiment, the two wings 11*a* and the main body 11*b* are integrated. In other embodiments, the two wings 11*a* and the main body 11*b* may be two separable components joined together by screwing or welding.

A positioning structure 19 is disposed at the front end of the main body 11*b*. This positioning structure 19 has a U-shaped fork with a U-shaped segment disposed on the rear fork of the bicycle frame. The two ends of the U-shaped fork pass sequentially through a lock piece of the positioning structure 19, the main body 11*b*, and another lock piece of the positioning structure 19, allowing the positioning plate to be fixed to the bicycle frame as a second fixed point. The U-shaped fork can be adjusted according to the angle of the rear fork of the bicycle frame to fit different bicycle models.

Two telescopic tubes 13, one end of each tube being mounted on the wing 11*a*, the other end of each tube extending in the X-direction to connect to a straight tube 15*a* of a T-shaped suspension mounting seat 15. The straight tube 15*a* is connected to the electric auxiliary wheel frame 30 through two suspension relief plates 12. The extension direction of the straight tube 15*a* is parallel to the Y-direction. The two suspension relief plates 12, which are triangular, are fixed to the outer sides of the straight tube 15*a*, with their base edges aligned parallel to the Z-direction. Bearings are provided between the two suspension relief plates 12 and the straight tube 15*a*, allowing the suspension relief plates 12 to function as relief clamps and to oscillate vertically relative to the straight tube 15*a* when a shock-absorbing spring 16 expands and contracts. In this embodiment, bearings 14 are installed at both ends of the two telescopic tubes 13, allowing the electric auxiliary wheel to accommodate the turning angles of the bicycle.

In the embodiment of the present disclosure, the electric auxiliary wheel frame 30 comprises two brackets 31 connected by a fastening plate 32, the two brackets 31 and the fastening plate 32 being fastened together. Each of the two brackets 31 is provided with a bearing sleeve 33, each of which protrudes from its bracket 31 in the X-direction toward the other bracket 31. Each bearing sleeve 33 is connected to one of the base edges of the suspension relief plates 12, thereby assembling the electric auxiliary wheel frame 30 with the assembly structure 10. In addition, a reflector (not shown) may be installed on the outside of the fastening plate 32 for recognition by vehicles from behind.

Furthermore, the T-shaped suspension mounting seat 15 also comprises a cross tube 15*b* vertically welded to the lower end of the straight tube 15*a*, the cross tube 15*b* is parallel to the previously mentioned bearing sleeves 33. The left and right ends of the cross tube 15*b* are connected to two positioning parts 34 of the electric auxiliary wheel frame 30, protruding obliquely downwards from the electric auxiliary wheel frame 30, thus more securely connecting the T-shaped suspension mounting seat 15 to the electric auxiliary wheel frame 30.

In addition, the two brackets 31 each have a wheel positioning part 35. Both ends of the axle of an electric hub 51 of an auxiliary wheel 50 are seated on the wheel positioning parts 35 of the two brackets 31, thereby fixing the auxiliary wheel 50 to the electric auxiliary wheel frame 30. The electric hub 51 drives the auxiliary wheel 50, and the electric auxiliary wheel frame 30 also has a mudguard 36 disposed behind the auxiliary wheel 50 to block water, mud, or stones from the road. The auxiliary wheel 50 is a puncture-resistant tire mounted on the electric hub 51.

In the embodiment of the present disclosure, the electric auxiliary wheel also comprises a shock-absorbing spring 16. The shock-absorbing spring 16 is installed in the Y-direction in front of the T-shaped suspension mounting seat 15. One end of the shock-absorbing spring 16 is inserted between the two suspension relief plates 12 and connected to the other base edge of the suspension relief plates 12, and the other end is attached to the straight tube 15*a* through a fixing component 17. The shock-absorbing spring 16 serves to counteract the vertical vibrations (i.e., in the Y-direction) of the electric hub 51 of the bicycle rear wheel 40, achieving a shock-absorbing effect.

The present disclosure allows the electric auxiliary wheel to be mounted on any bicycle through the easily detachable positioning plate 11. Additionally, the installation of the two telescopic tubes 13 and the T-shaped suspension mounting seat 15 helps to evenly distribute the vibrations generated by the auxiliary wheel 50 and the electric hub 51, making the structure more stable.

What is claimed is:

1. An electric auxiliary wheel comprising an assembly structure connecting an electric auxiliary wheel frame and a bicycle rear wheel, the assembly structure comprises:
    a positioning plate, detachably mounted on a hub axle of the bicycle rear wheel, with two wings located on the upper and lower sides of the positioning plate;
    two telescopic tubes, one end of each telescopic tube being mounted on the wing, the other end extending in an X-direction to be connected to a straight tube of a T-shaped suspension mounting seat; and
    two suspension relief plates, disposed on the left and right sides of the straight tube in the X-direction, the electric auxiliary wheel frame being connected to the two suspension relief plates to be assembled with the assembly structure.

2. The electric auxiliary wheel according to claim 1, wherein the electric auxiliary wheel frame comprises two brackets connected by a fastening plate, and is equipped with two bearing sleeves, each of the bearing sleeve protrudes from one of the brackets in the X-direction toward the other bracket.

3. The electric auxiliary wheel according to claim 2, wherein the T-shaped suspension mounting seat also comprises a cross tube perpendicular to one end of the straight tube, the cross tube is parallel to the two bearing sleeves.

4. The electric auxiliary wheel according to claim 3, wherein the two ends of the cross tube are connected to two positioning parts of the electric auxiliary wheel frame.

5. The electric auxiliary wheel according to claim 2, wherein the two suspension relief plates are triangular having their base edges aligned parallel to a Z-direction, and the two bearing sleeves are each connected to one of the base edges of the two suspension relief plates.

6. The electric auxiliary wheel according to claim 5, the electric auxiliary wheel further comprises a shock-absorbing spring, one end of the shock-absorbing spring is inserted between the two suspension relief plates and connected to the other base edge of the plates, the other end of the shock-absorbing spring being attached to the T-shaped suspension mounting seat by a fixing component.

7. The electric auxiliary wheel according to claim 1, wherein each of the telescopic tubes provides with a bearing at both ends.

8. The electric auxiliary wheel according to claim 1, wherein the electric auxiliary wheel frame is also equipped with a mudguard.

9. The electric auxiliary wheel according to claim 1, wherein the electric auxiliary wheel frame is also equipped with a wheel positioning part, in which wheel positioning part the axle of an electric hub of an auxiliary wheel is seated.

\* \* \* \* \*